United States Patent [19]

LoBiondo et al.

[11] 4,254,533
[45] Mar. 10, 1981

[54] MEAT PROCESSING MACHINE

[76] Inventors: Salvatore J. LoBiondo, 12 DeCamp Ct., West Caldwell, N.J. 07006; Joseph V. LoBiondo, 79 Winding La., Bloomfield, N.J. 07003

[21] Appl. No.: 71,309

[22] Filed: Aug. 30, 1979

[51] Int. Cl.³ ............................................. A22C 9/00
[52] U.S. Cl. ..................................................... 17/27
[58] Field of Search .......................... 17/25, 26, 27, 28

[56] References Cited

U.S. PATENT DOCUMENTS

| | | | |
|---|---|---|---|
| 463,255 | 11/1891 | Ricks | 17/27 |
| 1,589,208 | 6/1926 | Mitchell | 17/25 |
| 1,986,074 | 1/1935 | Spang | 17/27 X |
| 1,986,075 | 1/1935 | Spang | 17/27 X |
| 2,216,777 | 10/1940 | Hollstein | 17/26 X |
| 2,471,062 | 5/1949 | Davis | 17/55 |
| 3,644,125 | 2/1972 | LoBiondo et al. | 17/1 G |
| 3,786,536 | 1/1974 | Deckert | 17/25 |
| 3,893,384 | 7/1975 | LoBiondo et al. | 17/27 UX |

*Primary Examiner*—Willie G. Abercrombie
*Attorney, Agent, or Firm*—Norman N. Popper; Daniel H. Bobis

[57] ABSTRACT

A meat processing machine wherein a plurality of circular blades are rotated on a macerating blade shaft; between each of the blades, there is rigidly positioned, an arm with a generally rectangular cross-sectional area which performs the function of bearing on and compressing meat to be cut by the circular blades, and of stripping the meat from between the circular knives after it is cut; the rigid arms are highly resistent to deformation during the cutting process and are mounted at each end on shafts.

2 Claims, 3 Drawing Figures

MEAT PROCESSING MACHINE

BACKGROUND OF THE INVENTION

FIELD OF THE INVENTION

This invention relates generally to meat processing machinery and particularly to meat macerating apparatus wherein a comb of a plurality of rigid arms is supplied, wherein the arms are highly resistent to deformation and perform the function of compressing meat to be macerated, and further of stripping the compressed meat from between the blades.

PRIOR ART

Meat processing apparatus has frequently involved a slotted pressure plate which bears upon a piece of meat as it is engaged by rotating circular blades extending through slots in the plate. The pressure elements have at times taken the form of arcuate rods, having a circular cross-section, which rods are welded to supports at opposite ends. When the supports are removed from the processing machine, they often are carelessly mishandled and the rods are deformed so that they lose the uniformity of space normally existing between them. Such deformed rods do not properly engage the meat between the cutter blades and do not compress that meat so that it may be macerated by the circular cutter blades. Instead, the deflected rods of the comb permits the meat to be macerated unequally by compressing it unequally for the action of the blades. Even though the comb of rods is rigidly welded to the transverse supports, the rods were often deformed. In the interest of achieving a high degree of uniformity in macerating meats, it was sought to develop an arm to function as a meat compressor and stripper which was highly resistent to deformation. Thus various forms of arms were devised, were welded to sustaining bars at each end but these arms were found to be subject to deformation during handling.

SUMMARY OF THE INVENTION

Finally it was found that an arm could be devised which was highly resistant to deformation. There was provided first and second shafts for mounting the arms, which function as the meat compressors and strippers. The meat compressors and strippers were generally L-shaped metal members of very rigid, nondeflectable metal such as steel. These arms had a generally rectangular cross-sectional area which was substantially greater in extent than the thickness of the arms measured transversely. At the opposite end of each rigid arm, there were holes to enable the arms to be mounted on the shafts. These holes were made with close correspondence with the external diameter of the shafts whereby, when mounted thereon, they were highly resistent to deflection with respect to the shafts. In order to sustain the meat compressor and stripper arms in uniformly spaced relationship to each other and for positioning them between the circular blades, a plurality of spacers were mounted on the shafts between the rigid arms, whereby the arms were equally spaced from adjacent circular blades. In order to support the first and second shafts, several spacers were applied to the shafts and were provided with threaded legs for mounting the comb of meat compressor arms and strippers in proper spaced relationship to the circular blades. Thus the comb of arms could be rigidly mounted on a support frame. In this manner, there is provided a meat compressor and stripper which is highly resistent to deformation in use, or after use when it is disassembled for purposes of cleaning.

THE DRAWINGS

These objects and advantages as well as other objects and advantages may be obtained by the device shown by way of illustration in the drawings in which.

PREFERRED EMBODIMENT

Figure 1:
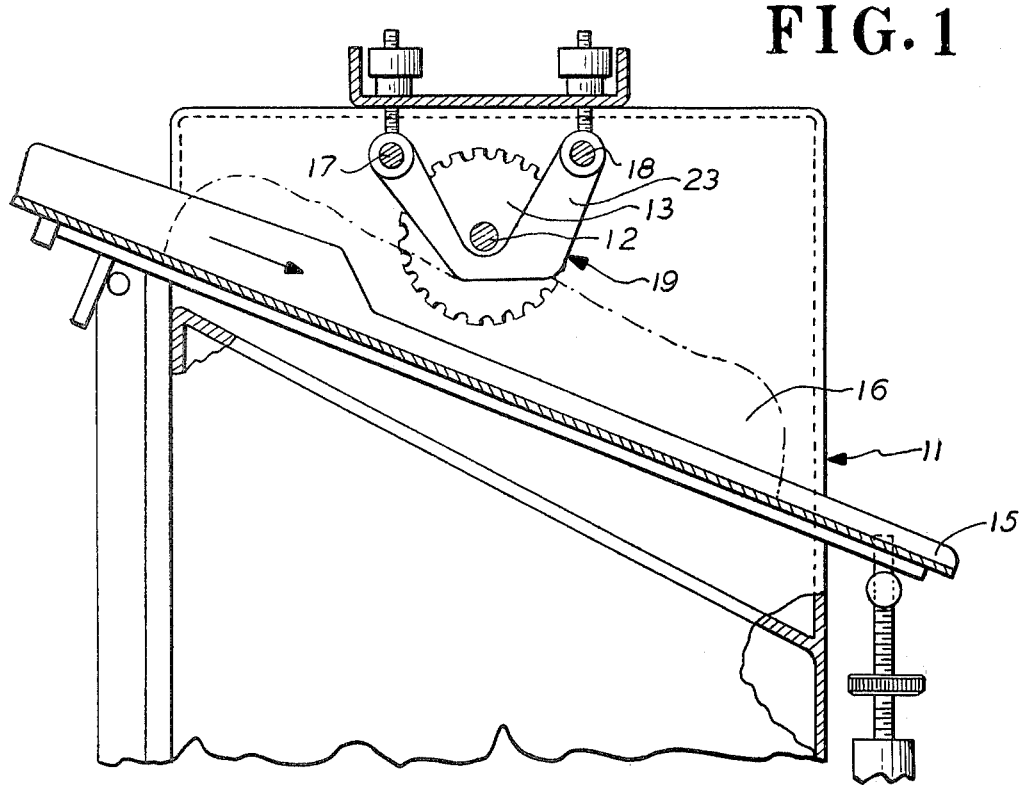
FIG. 1 is a vertical, elevational side view of the meat processing machine.
Figure 2:
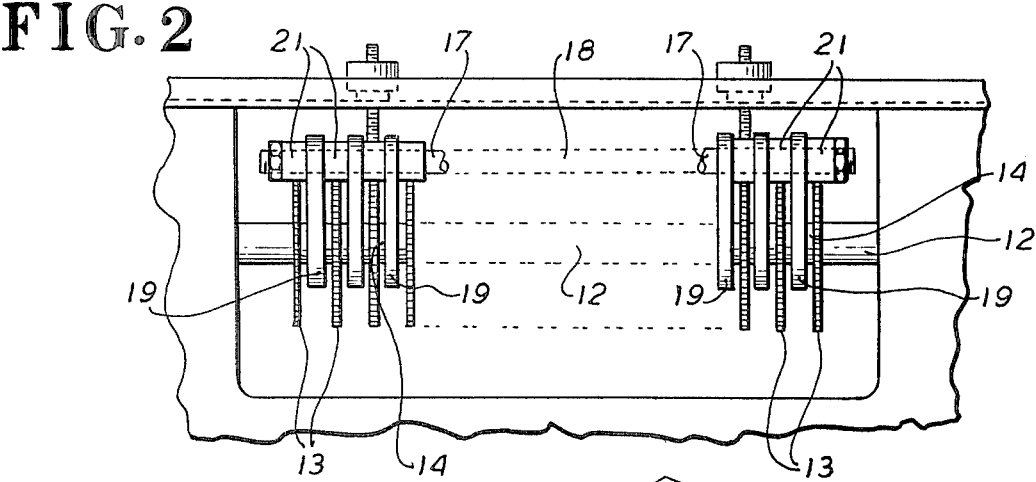
FIG. 2 is a partial, sectional, verical front view of the meat processing machine.
Figure 3:
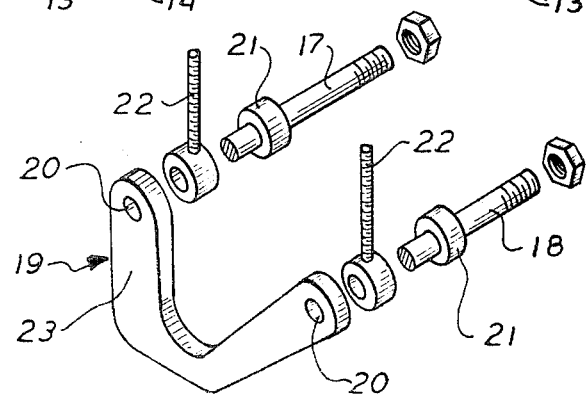
FIG. 3 is a perspective view of the means for mounting the meat compressors and strippers.

Referring now to the drawings in detail, the meat processing machine provides a housing 11. A macerating blade shaft 12 is mounted for rotation in the housing 11. Means to drive the macerating blade shaft (not shown) is operatively connected to the macerating blade shaft 12 so that it may be rotated. Mounted on the macerating blade shaft 12, there are a plurality of generally circular blades 13. The blades, shown by way of illustration, are of the kind which provide notched areas between sharp edges; other types of macerating blades may be utilized. A plurality of spacers 14 are carried by the macerating blade shaft to sustain the blades 13 in uniform spaced relationship to each other on the blade shaft 12. A meat supporting table 15 is mounted on the housing 11 below the blades 12, and in spaced relation thereto sufficient to provide for the movement of a piece of meat 16 thereon in contact with the blades 12 so that it may encounter the macerating action of the blades 12. The tearing action of the blades 12 draws the meat 16 into compressive contact with the rigid arms 19 and pulls the meat through.

A first stripper shaft 17 is mounted on the housing 11 above the blade shaft 12. A second stripper shaft 18 is mounted on the housing 11 above the blade shaft 12. A plurality of rigid arms 19 with a generally rectangular cross-sectional area define meat compressors and strippers; these rigid arms 19 are mounted on the first and second stripper shafts 17, 18. The rectangular cross-sectional area of the arms 19 is greater than the thickness of the arms so as to insure a high degree of rigidity. The second section 23 of the arms 19 is wider as shown In FIG. 1, so as to rigidly resist deformation as heavier pieces of meat pass under them. When arms 19 having the same width throughout are used, they do not fully resist deformation. There are holes 20 in the opposite ends of the arms for mounting them on and receiving the first and second stripper shafts 17, 18. These holes 20 have a close correspondence as to their internal diameter with the external diameter of the shafts 17, 18 whereby to resist deflection of the arms on the shafts. A plurality of spacers 21 on the first and second shafts 17, 18 are disposed between the arms 19 on the first and second shafts 17, 18 so that the arms 19 are disposed in spaced relation to each other and are in spaced relationship from the blades 13 mounted on the blade shaft 12. The arms 19 are intruded between the blades 13, 13 and extend toward the meat table 15 less than the distance from the periphery of the blades 13 to the meat table 15. Some of the spacers 21 are provided with integral threaded shafts 22 in order to attach the comb of arms 19 on the housing 11 in appropriate spaced relationship to the blades 13. In this manner, the spacers 21 enable the meat to be compressed by the arms 19 until it is macerated by the blades 13 and then the arms 19 strip the meat from the blades. The arms 19 are so positioned that the wider second section extends beyond the periphery of the blades 12 as shown in FIG. 1.

In this manner, more efficient maceration at uniform intervals is attained and a final efficient stripping action is accomplished.

What is claimed is:

1. A meat processing machine comprising,
   (a) a rotatably mounted blade shaft for macerating blades,
   (b) a plurality of macerating blades mounted on the blade shaft,
   (c) means to position the macerating blades in spaced relation to each other,
   (d) a meat supporting table below the macerating blades, in spaced relation thereto, sufficiently close to the macerating blades to forcibly engage a piece of meat traversing the table in contact with the macerating blades,
   (e) a first stripper shaft rigidly mounted above the macerating blade shaft,
   (f) a second stripper shaft rigidly mounted above the macerating blade shaft,
   (g) a plurality of generally L-shaped arms with a generally rectangular cross-sectional area defining meat compressors and strippers mounted at opposite ends on the first and second stripper shafts and extending under the blade shaft,
   (h) a first wide latitudinal section of each L-shaped arm attached to the first stripper shaft,
   (i) a second wider latitudinal section of each L-shaped arm wider than the first wide latitudinal section attached to the second stripper shaft to rigidly resist deformation,
   (j) each arm having a relativly wide, flat blunt edge defining a compressor surface,
   (k) means for disposing the L-shaped arms in spaced relation to each other and in spaced relation to and between the macerating blades,
   (l) the arms extending toward the meat table for a distance less than the distance of the periphery of the macerating blade to the meat table.

2. A meat processing machine according to claim 1, and
   (a) the wider second section extending beyond the periphery of the blades toward the discharge end of the machine.

* * * * *